(12) United States Patent
Griffin et al.

(10) Patent No.: US 6,889,253 B2
(45) Date of Patent: May 3, 2005

(54) CLUSTER RESOURCE ACTION IN CLUSTERED COMPUTER SYSTEM INCORPORATION PREPARE OPERATION

(75) Inventors: Kevin Curtis Griffin, Rochester, MN (US); Michael James McDermott, Oronoco, MN (US); James Gregory Ranweiler, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 09/845,592

(22) Filed: Apr. 30, 2001

(65) Prior Publication Data

US 2002/0161869 A1 Oct. 31, 2002

(51) Int. Cl.[7] .............................................. G06F 15/177
(52) U.S. Cl. ..................................... 709/221; 709/226
(58) Field of Search ............................... 709/220–223, 709/224, 225, 226

(56) References Cited

U.S. PATENT DOCUMENTS 6,014,669 A * 1/2000 Slaughter et al. ............. 707/10

FOREIGN PATENT DOCUMENTS

EP           0 772 126 A2    5/1997

OTHER PUBLICATIONS

Kroneberg et al., "VAXclusters: A Closely–Coupled Distributed System," ACM Transactions on Computer Systems, vol. 4, No. 2, May 1986, pp. 130–146).

Vogels et al, "The Design and Architecture of the Microsoft Cluster Service—A Practical Approach to High–Availability and Scalability," Fault–Tolerant Computing, 1998, Digest of Papers, Twenty–Eighth Annual International Symposium on Munich, Germany, Jun. 23–25, 1998, pp. 422–431.

* cited by examiner

*Primary Examiner*—Fritz M. Fleming
(74) *Attorney, Agent, or Firm*—Wood, Herron & Evans, LLP

(57) ABSTRACT

An apparatus, clustered computer system, program product and method utilize a unique prepare operation in connection with a resource action to effectively "lock out" missing or inactive cluster entities such as nodes and cluster objects from rejoining a clustered computer system subsequent to the resource action. The prepare operation includes the modification of one or more cluster configuration parameters associated with a plurality of entities in a clustered computer system, such that any such cluster entity that is active during the prepare operation accepts the modifications, while any such cluster entity that is inactive during the prepare operation does not accept the modifications. By modifying cluster configuration parameters for active cluster entities, attempts by previously-inactive cluster entities to activate or rejoin clustering subsequent to resource actions will generally fail due to an incorrect or stale cluster configuration parameters for such entities, and as a result, such entities will be effectively blocked from being accepted into the clustered computer system.

27 Claims, 4 Drawing Sheets

CLUSTER RESOURCE ACTION IN CLUSTERED COMPUTER SYSTEM INCORPORATION PREPARE OPERATION

FIELD OF THE INVENTION

The invention is generally directed to clustered computer systems, and in particular, to the handling of resource actions thereon.

BACKGROUND OF THE INVENTION

"Clustering" generally refers to a computer system organization where multiple computers, or nodes, are networked together to cooperatively perform computer tasks. An important aspect of a computer cluster is that all of the nodes in the cluster present a single system image—that is, from the perspective of a user, the nodes in a cluster appear collectively as a single computer, or entity.

Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

Clusters typically handle computer tasks through the performance of "jobs" or "processes" within individual nodes. In some instances, jobs being performed by different nodes cooperate with one another to handle a computer task. Such cooperative jobs are typically capable of communicating with one another, and are typically managed in a cluster using a logical entity known as a "group." A group is typically assigned some form of identifier, and each job in the group is tagged with that identifier to indicate its membership in the group. Many cluster management operations are also handled through the use of a group of cooperative jobs, often referred to as a cluster control group.

Member jobs in a group typically communicate with one another using an ordered message-based scheme, where the specific ordering of messages sent between group members is maintained so that every member sees messages sent by other members in the same order as every other member, thus ensuring synchronization between nodes. Requests for operations to be performed by the members of a group are often referred to as "protocols," and it is typically through the use of one or more protocols that tasks are cooperatively performed by the members of a group.

Clustered computer systems place a high premium on maximizing system availability. As such, automated error detection and recovery are extremely desirable attributes in such systems. One potential source of errors is that of losses of any resources that are used in the management and operation of a clustered computer system, e.g., memory address ranges and input/output (I/O) devices.

Especially for system-critical applications that demand high availability, managing resources, and in particular, recovering lost resources, can substantially improve the reliability of an application that uses those resources. In some situations, resources are transferred between nodes and other entities in a cluster, and it is often during these transfers that the risk of losing a resource is greatest. To avoid the exposure of two entities owning the same resource, typically a clustered computer system requires that an entity giving the resource release ownership before transferring the resource. Therefore, if a failure occurs between the giving entity releasing ownership of the resource and the other entity taking ownership of the resource, the resource may be lost.

It would be highly desirable in many clustered computer systems to be able to recover lost resources so that such resources can be used by other entities. However, conventional systems have not provided any reliable manner of recovering lost resources. In addition, other types of resource-related actions, e.g., transferring resources between entities or types of entities, may also present similar risks. For example, for resources such as virtual address ranges, it may be desirable to shift resources between different entities, or between different types of entities.

Therefore, a significant need exists in the art for a manner of performing resource actions on the resources in a clustered computer system, and in particular, a manner of effectively managing resources with reduced risk of resource conflicts and other potential errors.

SUMMARY OF THE INVENTION

The invention addresses these and other problems associated with the prior art by providing an apparatus, clustered computer system, program product and method that utilize a unique prepare operation in connection with a resource action to effectively "lock out" missing or inactive cluster entities such as nodes and cluster objects from rejoining a clustered computer system subsequent to the resource action. Doing so minimizes the risk that inactive cluster entities will reactivate and attempt to utilize resources that may have been transferred to other cluster entities in a clustered computer system, which may potentially create resource conflicts.

In the illustrated embodiments, a prepare operation includes the modification of one or more cluster configuration parameters associated with a plurality of entities in a clustered computer system, such that any such cluster entity that is active during the prepare operation accepts the modifications, while any such cluster entity that is inactive during the prepare operation does not accept the modifications. Moreover, typically in the illustrated embodiments, attempts by previously-inactive cluster entities to activate or rejoin clustering subsequent to a resource action will result in the detection of either incorrect or stale cluster configuration parameters for such entities, which will effectively block such cluster entities from being accepted into the clustered computer system.

Furthermore, various embodiments consistent with the invention also incorporate a lock that is acquired on each node in the clustered computer system prior to modifying a node configuration parameter associated with the various nodes, and prior to modifying an object configuration parameter associated with the various cluster objects. The lock is released upon completion of the modifications, and thereafter any inactive nodes and/or cluster objects that could own a resource of interest are blocked from later acceptance into the clustered computer system.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
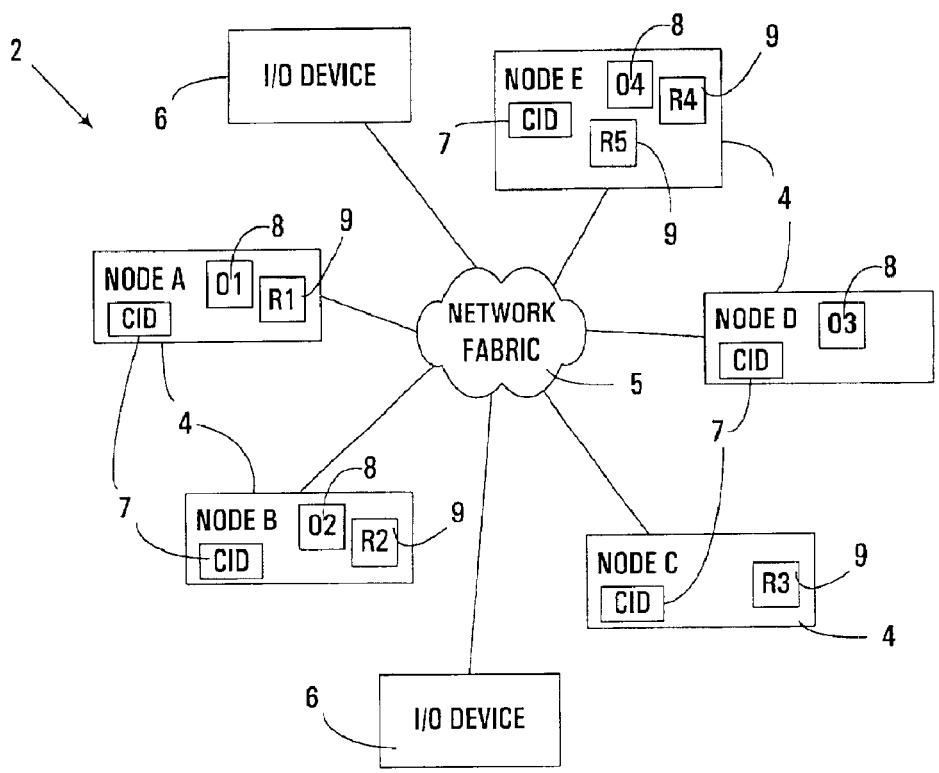
FIG. 1 is a block diagram of a clustered computer system consistent with the invention.

The embodiments described hereinafter utilize a prepare operation in connection with the performance of a resource action to effectively "lock out" missing or inactive cluster entities from being accepted into a clustered computer system subsequent to a modification in resource ownership in the system. One or more cluster configuration parameters associated with an affected type of cluster entity are modified during the prepare operation, such that only active instances of such cluster entities accept the modification. Inactive instances of such cluster entities do not accept the modification, such that subsequent attempts by those inactive cluster entities to activate and rejoin clustering will fail due to invalid parameters.

A resource in this context generally refers to a type of entity or "thing" that is required to perform some processing task, where a limited number of such things exist, and where any such thing is required to be "owned" in order to be used. A cluster entity generally refers to a logical software construct utilized in clustering, and which is capable of "owning" a resource, i.e., of utilizing and/or managing the resource in its operation.

In the illustrated embodiments, for example, cluster entities may include cluster nodes (i.e., individual computer systems and/or logical partitions residing within those systems that function as "nodes" in a multi-node cluster) and/or cluster objects (i.e., logical entities within a clustered computer system that participate in clustering and/or assist in the management of a cluster). For example, in the embodiments discussed hereinafter, a cluster object might represent a set or group of Input/Output (I/O) devices such as Direct Access Storage Devices (DASD's) that are managed collectively and accessed as a single logical device.

In addition, in the illustrated embodiments, resources such as virtual addresses or ranges of virtual addresses, Input/Output (I/O) devices, and the like are managed in the manner described herein. More specifically, such resources are typically represented via identifiers, such that a resource is typically owned by virtue of the association of a particular identifier with a particular cluster entity. Thus, for example, a range of addresses in a virtual memory space may be represented by the boundary addresses of the range, while I/O devices such as DASD's may be represented by unique identifiers or numbers associated with such devices. Moreover, in the illustrated embodiments, a cluster object may be considered to be both a cluster entity and a resource insofar that cluster objects, which are capable of owning other resources, are typically themselves owned by a cluster node. In such instances, the cluster object may be represented by a unique identifier such as an object identifier that is associated with an owning cluster node.

A cluster configuration parameter may represent any data maintained in association with a cluster entity such as a cluster node or cluster object that may be used to detect whether a particular instance of a cluster entity was active prior to a resource action. The detection of the status of a cluster configuration parameter may be used to simply signal an error and/or prevent an entity from rejoining a cluster. In the alternative, the detected parameter may be used to perform recovery operations suitable for releasing resources prior to allowing a cluster entity to rejoin a cluster.

In the illustrated embodiment, for example, the cluster configuration parameter used in connection with a cluster node is a cluster identifier (CID), which is used as a common "token" or unique identifier shared by all of the active nodes in a particular instance of a cluster. The cluster management software in the cluster is then required to validate the CID for a particular node that attempts to join the cluster, otherwise the cluster node is rejected and blocked from joining the cluster. Typically, the CID is used outside of resource management as a security mechanism to permit only authorized nodes to join a cluster. Thus, typically no modification of the node management routines in a clustered computer system is required to implement the herein-described functionality.

For cluster objects, the cluster configuration parameter used is an object configuration parameter such as an ownership transfer count (OTC) maintained in each cluster object, which may optionally be used in connection with a cluster object identifier.

It should be appreciated that other parameters may be used to block inactive cluster entities from rejoining a cluster consistent with the invention. In addition, it should be appreciated that different types of resources may only be capable of being owned by certain types of entities, whereby a prepare operation as discussed herein may only affect certain types of entities that are relevant for a particular type of resource being acted upon. Therefore, the invention is not limited to the particular implementations discussed herein.

Now turning to the Drawings, wherein like numbers denote like parts throughout the several views, FIG. 1 shows a clustered computer system 2 including a plurality of nodes 4 interconnected with one another via a network fabric 5. Any number of network topologies commonly utilized in clustered computer systems may be used consistent with the invention, e.g., a high speed point-to-point bus or link, a local area network, a wide area network, a public network such as the Internet, etc., and combinations thereof. Moreover, individual nodes 4 may be physically located in close proximity with other nodes, or may be geographically separated from other nodes, as is well known in the art.

Typically, a clustered computer system will also incorporate one or more I/O devices such as I/O devices 7, which may be interconnected with individual nodes through network fabric 5. Moreover, in some instances, access to a device 7 over network fabric 5 may be managed by an intermediate node, rather than the device 7 being directly coupled to the network fabric. Various I/O devices are contemplated, e.g., DASD's, workstations, storage controllers, workstation controllers, network adaptors, printers, displays, etc.

Consistent with the invention, a plurality of cluster entities are resident in clustered computer system 2. For example, a plurality of nodes 4 (also denoted separately as nodes A–E) are shown. A cluster configuration parameter therefore, referred to herein as a cluster ID (CID) 7, is maintained within each node. A plurality of cluster objects 8 (an exemplary number of which are denoted separately as objects O1–O4) are also shown in FIG. 1, with each incorporating a cluster configuration parameter (not shown in FIG. 1).

The various cluster entities described above are configured to manage and utilize a plurality of resources 9, an exemplary number of such resources are designated separately in FIG. 1 as resources R1–R5. The manner in which such resources are owned and managed by the cluster entities described above are described in more detail in connection with FIGS. 3–8 below.

Figure 2:
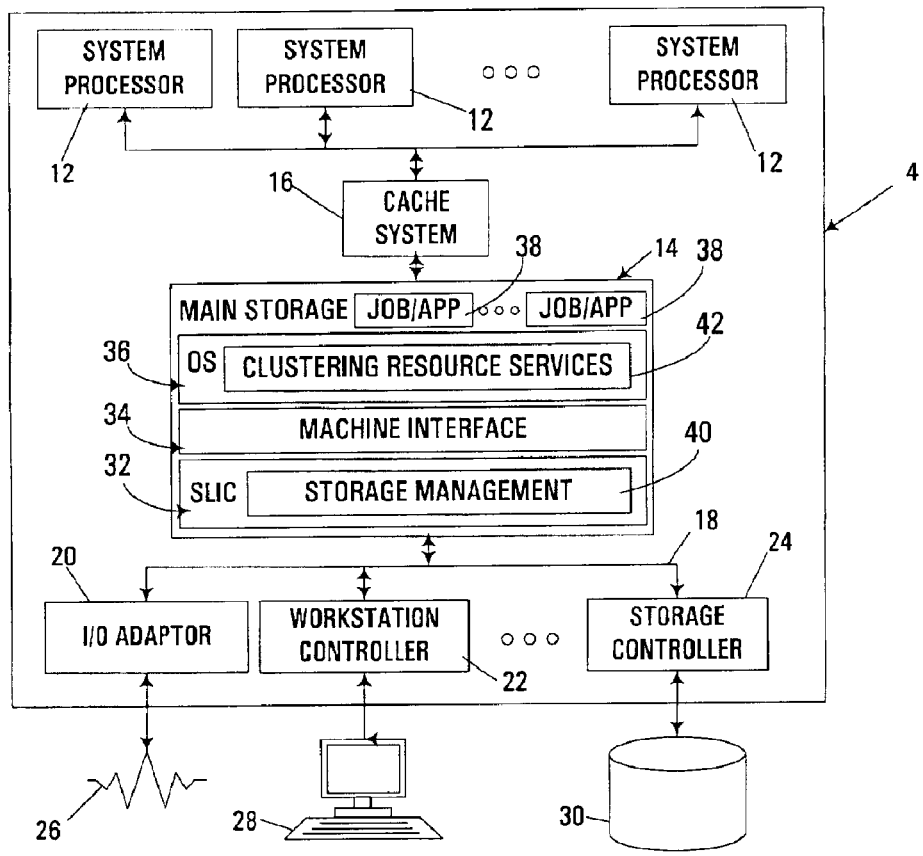
FIG. 2 is a block diagram of a node in the clustered computer system of FIG. 1.

Now turning to FIG. 2, an exemplary hardware configuration for one of the nodes 4 in clustered computer system 2 is shown. Node 4 generically represents, for example, any of a number of multi-user computers such as a network server, a midrange computer, a mainframe computer, etc., e.g., an AS/400 or iSeries midrange computer system available from International Business Machines Corporation. However, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like).

Node 4 generally includes one or more system processors 12 coupled to a main storage 14 through one or more levels of cache memory disposed within a cache system 16. Furthermore, main storage 14 is coupled to a number of types of external devices via a system input/output (I/O) bus 18 and a plurality of interface devices, e.g., an input/output adaptor 20, a workstation controller 22 and a storage controller 24, which respectively provide external access to one or more external networks (e.g., a network 26), one or more workstations 28, and/or one or more storage devices such as a direct access storage device (DASD) 30. Any number of alternate computer architectures may be used in the alternative.

To implement the herein-described clustering functionality in an AS/400 environment, each node in a cluster typically includes system program code partitioned into system licensed internal code (SLIC) 32, a machine interface 34 and an operating system 36, each of which is shown resident in main storage 14, but which is typically selectively paged in and out of the main storage in practice using a virtual memory management system that is well known in the art. Tasks are performed on behalf of users by one or more jobs or applications 38 which utilize the underlying system program code in performing such tasks.

A portion of the SLIC 32 is typically allocated to managing memory and external storage, represented by storage management block 40. Moreover, when utilized in a clustering environment, node 4 typically executes a clustering infrastructure referred to as clustering resource services 42 to manage the clustering-related related operations on the node. In addition, clustering may require the execution of a cluster control (CTL) job as one of jobs 38 that participates in a cluster control group to assist in managing clustering functionality on behalf of the node. It is within these programs that much of the herein-described resource management functionality is implemented.

It will be appreciated, however, that the functionality described herein may be implemented in other layers of software in node 4, and that the functionality may be allocated among other programs, computers or components in clustered computer system 2. In particular, in non-AS/400 environments, the system program code as well as clustering infrastructure may be implemented in other layers of program code.

Moreover, other clustering environments typically rely on functionality analogous to a clustering infrastructure and a cluster control group. Therefore, the invention is not limited to the specific software implementation described herein.

The discussion hereinafter will focus on the specific routines utilized to implement the above-described resource management functionality. The routines executed to implement the embodiments of the invention, whether implemented as part of an operating system or a specific application, component, program, object, module or sequence of instructions, will also be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

It will be appreciated that various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Now turning to an exemplary implementation of the aforementioned resource management functionality, it has been found that, with the above-described system, to ensure that a resource action such as a resource recovery or resource ownership transfer is accurate and complete, four conditions should be satisfied:

All cluster nodes must be present, and any cluster node that is inactive or missing when the resource action is performed cannot be accepted into the cluster at a later time.

No transfer of resources between cluster nodes can occur concurrently with the resource action.

All cluster objects that could own the specific resource must be present, and any cluster object that is inactive or missing when the resource action is performed cannot be accepted into any cluster node at a later time.

No transfer of resources between a cluster node and a cluster object can occur concurrently with the resource action.

In the embodiment described hereinafter, to satisfy these conditions, a unique prepare operation is used in connection with and precedes a resource action to perform the following operations:

Serialize all cluster nodes to ensure all cluster nodes are active and obtain a lock on each cluster node to prevent the transfer of resources, prevent nodes from leaving or joining the cluster, and prevent the creation or deletion of cluster objects. If a lock cannot be acquired within a reasonable time, the prepare will fail and the resource action will be prevented from being performed.

Change a unique identifier that ties cluster nodes together, such that any inactive cluster node cannot be later accepted into the cluster.

Ensure that all cluster objects that could own the specific resource are present, otherwise the prepare fails.

Change the configuration data (e.g., a cluster object identifier) for all such cluster objects, such that any inactive cluster object cannot be accepted into the cluster at a later time, and such that any inactive node cannot accept an active cluster object at a later time.

Figure 3:
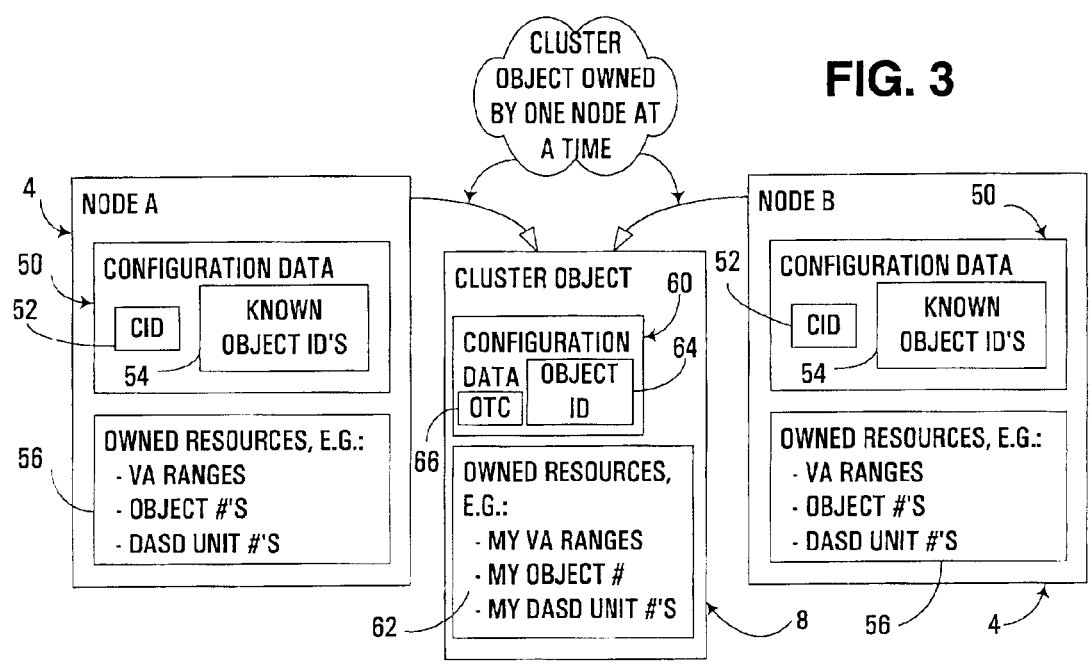
FIG. 3 is a block diagram of exemplary cluster entities in the clustered computer system of FIG. 1.

FIG. 3 next illustrates an exemplary set of cluster entities, as well as the relevant data structures maintained within each of those entities in connection with resource management consistent with the invention. For example, a pair of nodes 4 are illustrated, each including configuration data 50 including a Cluster ID (CID) 52 and a table or list of known object ID's 54, representing the handles or tokens associated with the various cluster objects known to be resident within the clustered computer system. Moreover, each node 4 typically maintains a list 56 of owned resources including, for example, virtual address ranges, object numbers, DASD unit numbers, and the like. In the illustrated embodiment, objects include both identifiers and numbers which each uniquely identify the object. In other embodiments, however, a single unique identifier may be used to identify each object.

Also shown in FIG. 3 is an exemplary cluster object 8, which includes configuration data 60 and a list or table 62 of owned resources. The configuration data includes, for example, an object ID 64 associated with the cluster object, as well as an Ownership Transfer Count (OTC) 66 for that object. Moreover, the owned resources associated with that cluster object may include various virtual address ranges, as well as the object number for the cluster object. A cluster object may represent, for example, one or more DASD units implemented within an I/O tower coupled to an AS/400-based clustered computer system. Thus, for example, the cluster object may logically represent various hierarchical devices within the interface chain to one or more DASD units, including multiple Input/Output Adaptors (IOA's), as well as one or more Input/Output Processors (IOP's). Moreover, the owned resources may include the identification of one or more DASD units owned by the cluster object.

In the illustrated embodiment, the cluster configuration parameter tracked for each node 4 is the CID 52, while the cluster parameter tracked for each cluster object is the combination of the object ID 64 and OTC 66, with typically the OTC 66 modified during each resource action.

Figure 4:
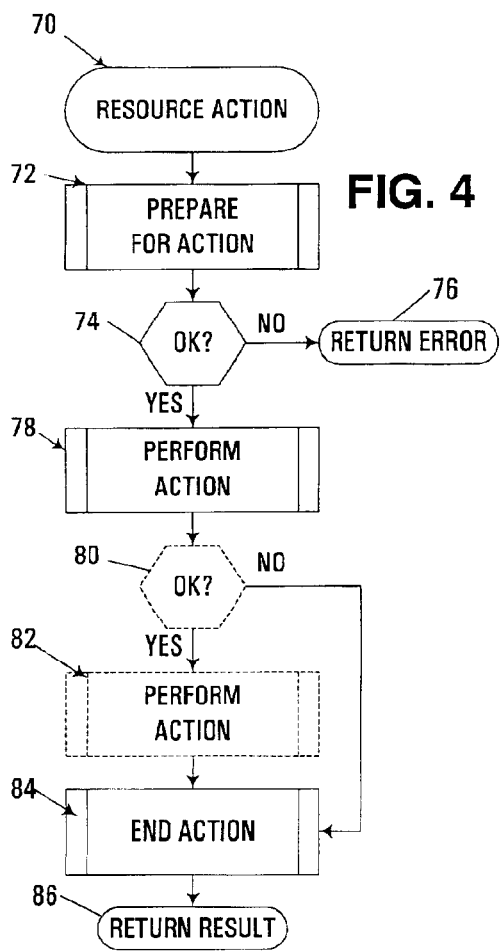
FIG. 4 is a flowchart illustrating the program flow of a resource action routine performed by the clustered computer system of FIG. 1.

FIG. 4 next illustrates an exemplary routine 70 for implementing a resource action consistent with the invention. As discussed above, a resource action typically includes a preceding prepare for action operation that is performed, for example, by a prepare for action routine 72. Routine 72 returns a result indicating whether the operation was performed successfully. If not, the resource action is terminated prematurely by passing control from block 74 to block 76, with an error returned as the result. If the prepare for action occurred successfully, however, block 74 passes control to block 78 to perform the desired resource action.

In some embodiments, it may be desirable to perform multiple resource actions subsequent to a single prepare. As such, it may be desirable to perform one or more additional resource actions as represented by optional routine 82. Moreover, it may be desirable to query the result of a preceding resource action prior to performing subsequent resource actions, as represented by optional block 80. Regardless, once a prepare action has been successfully performed, and one or more resource actions are attempted, an end action routine 84 is typically performed to release the lock placed on the clustered computer system as a result of the prepare action. Upon completion of end action routine 84, the appropriate result is returned to the original calling routine as shown in block 86. The result may indicate an error or the lack of an error, depending upon the progression of the routine, as will be discussed in greater detail below.

Figure 5:
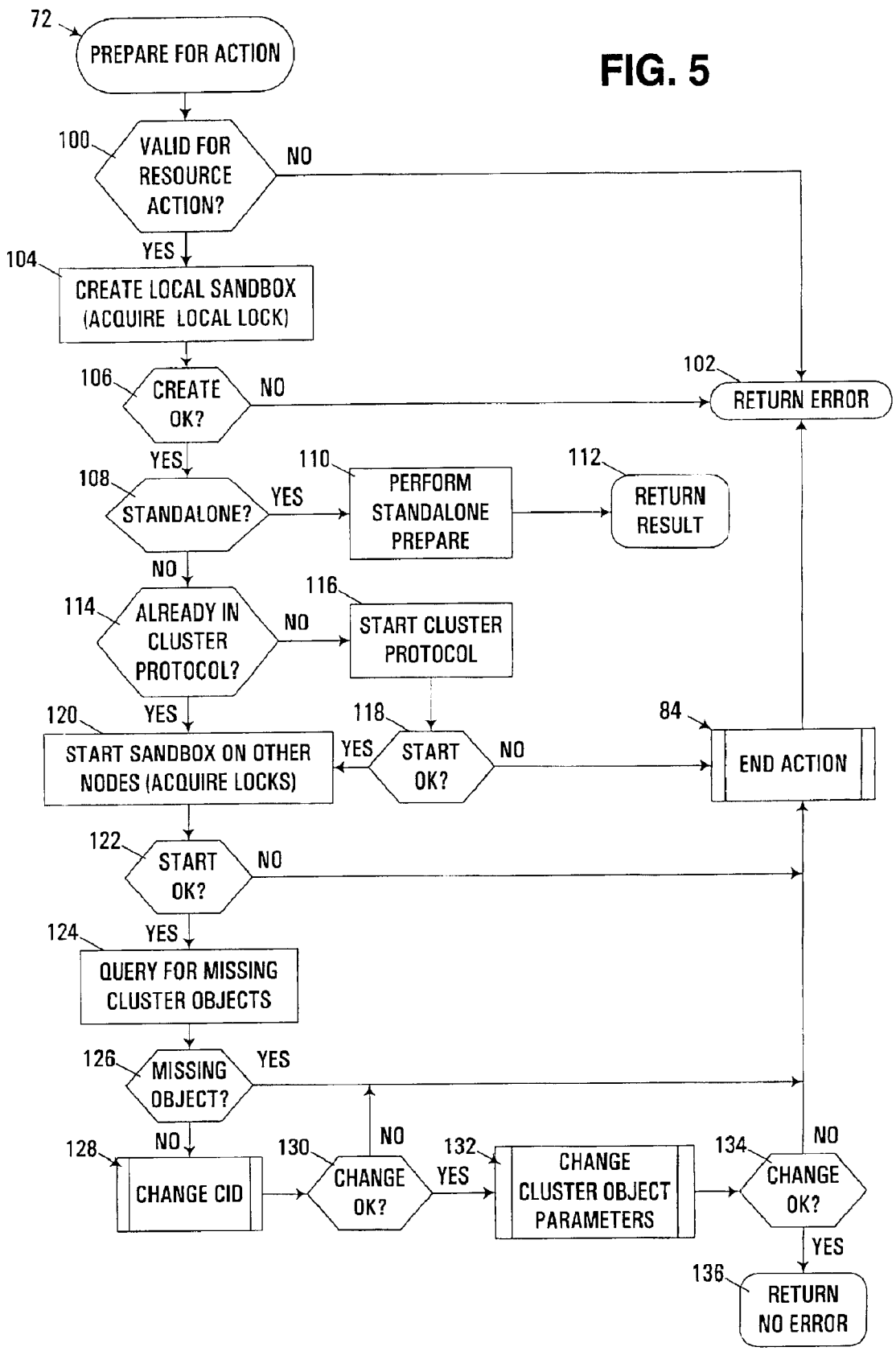
FIG. 5 is a flowchart illustrating the program flow of the prepare for action routine referenced in FIG. 4.

FIG. 5 illustrates prepare for action routine 72 in greater detail. Routine 72 is typically called by a node in a clustered computer system whenever it is determined that a resource action needs to be performed. For example, in response to a detection of a lost resource, or low resources on a particular node, that node in the clustered computer system may initiate the resource action.

Routine 72 begins in block 100 by determining whether the environment is valid for a prepare, including various checks such as whether the node is in an appropriate clustering environment. If not, block 100 passes control to block 102 to return an error condition and terminate the resource action.

Otherwise, block 100 passes control to block 104 to create a local sandbox and thus acquire a local lock on the node. In this context, a sandbox refers to a software object that creates a workspace for the node and serializes the operation of the node. Typically, only one sandbox may be executing at a given time on a node, and moreover, the modifications made to a cluster when in a sandbox must be committed or finalized before they are persisted to the cluster upon termination of the sandbox. The result of creating the sandbox is that the node is serialized, to the extent that cluster objects cannot be created or deleted, resource ownership cannot be modified, and nodes may not be added or removed (from the perspective of the local node) to and from the clustered computer system. It should be appreciated, however, that other forms of locks or semaphores may be utilized to serialize the operation of the local node consistent with the invention.

Upon completion of block 104, block 106 determines whether the creation of the local sandbox was successful. If not, control passes to block 102 to terminate routine 72. Otherwise, control passes to block 108 to optionally determine whether the local node is standalone mode, and not participating in clustering. If so, control passes to block 110 to perform a standalone prepare operation, and then to block 112 to return the result of that prepare operation. A standalone prepare operation may be implemented, for example, by verifying that all configured cluster objects on the node are owned and active and updating the cluster object configuration data as appropriate to lock out any missing cluster objects. Typically, in a standalone configuration, much of the node-related functionality described hereinafter in connection with the clustering environment prepare may be omitted, although in certain circumstances it may be desirable to utilize similar functionality, such as when a node is in standalone mode due to the elimination of other nodes in a clustering environment.

Returning to block 108, if the node is not in standalone mode, control passes to block 114 to determine whether the prepare operation is being performed within an existing cluster protocol. In particular, a resource action may be performed within or separate from a cluster protocol, and multiple resource actions may be performed within a single cluster protocol. In the illustrated embodiment, a cluster protocol must be initiated prior to performing any resource action, so that nodes may communicate with one another to ensure completion of the prepare and resource actions. Thus, if no cluster protocol has been established as yet, block 114 passes control to block 116 to start a cluster protocol and initiate communication between the nodes. Block 118 next determines whether the attempt to start the protocol was successful. If not, block 118 calls end action routine 84 (discussed below) or another routine with similar functionality, which results in an error being generated and that error returned as the result of the prepare.

However, if the attempt to start the cluster protocol was successful, block 118 passes control to block 120 to start a sandbox on the other nodes, thus acquiring locks on each of the other nodes. In addition, returning to block 114, if the cluster protocol already exists, control passes directly to block 120.

By initiating a sandbox in each other node, a local sandbox is created on each local node. Typically, some delay is utilized in the first node to wait for each other node to create the sandbox and return an appropriate response. If appropriate responses are not returned within a set period of time, block 122 will determine that the prepare has failed, and thus pass control to end action routine 84 to terminate the prepare operation. In addition, if any node is not active, but is sent a message to start a sandbox, that node will not respond in an appropriate time period, and will thus cause failure of the prepare operation. As such, the operation of starting the sandbox on the other nodes effectively determines whether every known node is active on the system.

If the sandboxes are successfully created, block 122 passes control to block 124 to query the other nodes for missing cluster objects. In the illustrated implementation, block 124 is implemented by passing queries to each other node to determine whether each known object (as stored in the list 54 of known object ID's, FIG. 3) has an owner. Block 126 then determines whether any missing objects (objects without owners) exist. If so, control passes to routine 84, and the prepare action is terminated. Otherwise, control passes to block 128 to implement a change CID routine that updates the configuration parameter for each cluster node.

In the illustrated implementation, the operations of starting the sandbox on the other nodes, querying for missing cluster objects, and the like, are implemented using ordered messages via the cluster protocol initiated in connection with the resource action. Thus, for example, a request to start a sandbox on the other nodes results in a message being sent to each node, and with the response message sent by each node indicating whether the sandbox was successfully started on that node. Likewise, a query for a missing cluster object results in a message being sent to each node identifying the cluster object of interest. Each node then responds with a message indicating whether that object is owned by the node. A missing object may therefore be detected by the reception of only messages that do not indicate ownership of an object by the responding node.

Change CID routine 128 is used to change the cluster identifier associated with each active node, such that any inactive nodes will not be similarly updated, and will thus be prevented from participating in clustering subsequent to the prepare.

Routine 128 returns a result, which is queried in block 130. If the change was not performed successfully, routine 84 is called, and the prepare operation fails. Otherwise, control passes to block 132 to change the cluster object parameters for the various cluster objects of interest to lock out any inactive cluster objects from rejoining the cluster. It should be appreciated that, if a prepare operation is being performed in connection with a particular type of resource action on a specific type of resource, only the cluster objects owning resources of that type (e.g., a virtual address range versus a DASD unit number) may be changed. Changing the cluster object parameters typically incorporates passing messages to the node that owns the object, as well as the all additional nodes, so that each node may update the object configuration parameter data that is local to its node. The node that does own the cluster object, however, additionally changes the local information with the cluster object.

Routine 132 similarly returns a result, which is queried in block 134. If the change operation was not performed successfully, control passes to routine 84 to end the action and terminate the prepare. Otherwise, a successful result is indicated by returning with a "no error" condition, as represented by block 136.

Changing a cluster configuration parameter may be performed by simply changing a single value associated with a parameter, and typically utilizing ordered messaging to ensure that the change is propagated to every relevant cluster entity. In the alternative, it may be desirable to utilize multiple values for each cluster configuration parameter, representing a current value and a "to become" value. When changing the parameter, first the "to become" value is changed to the new value, then the regular copy is changed to the new value. Thus, if the process fails at any point, all of the nodes may still match on at least one value.

Figure 6:
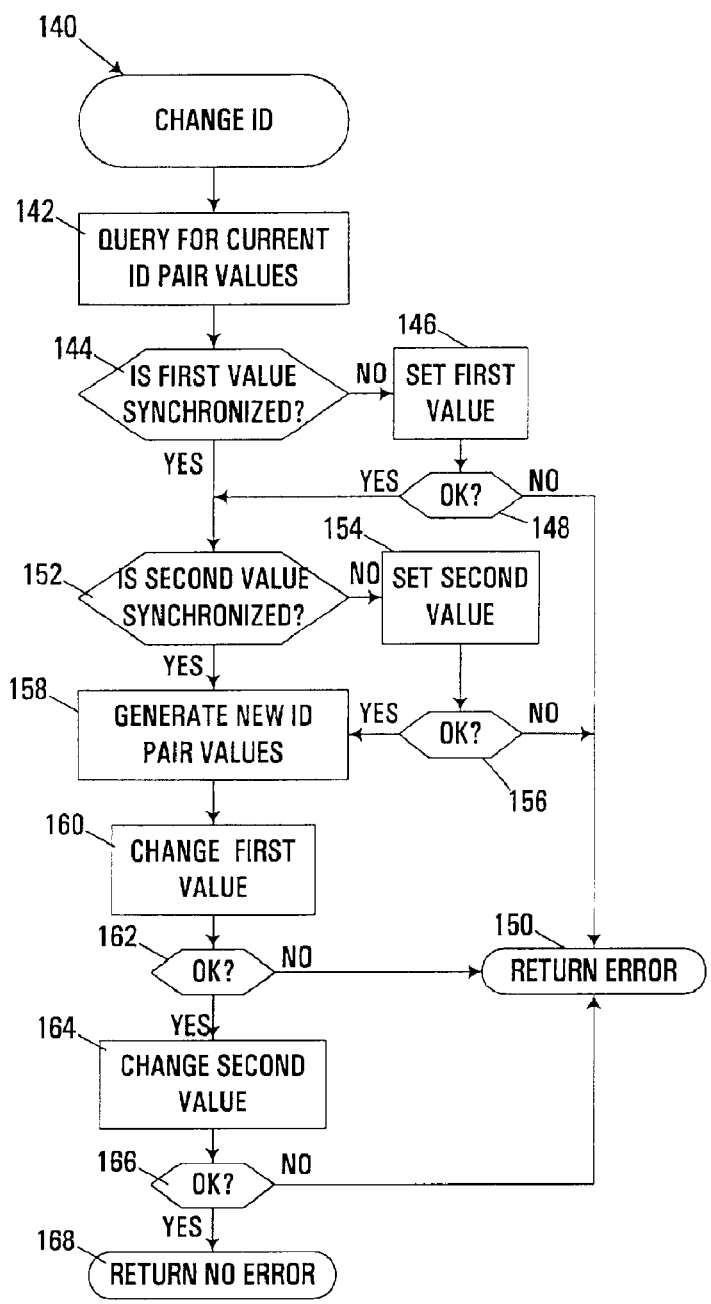
FIG. 6 is a flowchart illustrating the program flow of a change ID routine suitable for changing a cluster configuration parameter in the prepare for routine of FIG. 5.

An exemplary routine which may be used to change either the cluster ID or the cluster object parameters using value pairs is illustrated by change ID routine 140 of FIG. 6. It should be appreciated that any reference to an "ID" may refer to either a cluster ID or a clustered object parameter depending on the particular cluster configuration parameter being modified.

Routine 140 begins in block 142 by querying for the current ID pair values stored on each node. Typically, block 142 is implemented using ordered messages, with each node responding with its current values for a particular parameter in response to a request.

Block 144 next determines whether the first value is synchronized, i.e., whether the same first value is stored on each node. If not, control passes to block 146 to set the first value on each node to an arbitrary value selected by the node upon which routine 140 is executing. The set operation also is performed via ordered messages, and as a result, appropriate response messages are awaited to confirm that each node has successfully updated its value. Block 148 therefore determines whether the first value was successfully updated, and if any error is detected, control passes to block 150 to terminate routine 140 and return an error condition. Otherwise, block 148 passes control to block 152 to determine whether the second value is synchronized. Also, if block 144 determines the first value is synchronized, control passes directly to block 152.

If the second value is not synchronized, control passes to block 154 to set the second value in the same manner as the first value was set in connection with block 146. Block 156 then determines whether the set operation was successful, passing control to block 150 if an error is detected. Otherwise, block 156 passes control to block 158 to generate new ID pair values, e.g., by incrementing the values from their original state. In the alternative, any arbitrary number may be selected for each value, as long as the change is propagated to all of the nodes. Also, returning to block 152, if the second value is synchronized, control passes directly to block 158.

Once the new parameter values are generated, control passes to block 160 to change the first value. As with block 146, changing the first value is performed via ordered messages, and block 162 subsequently determines whether the first value was successfully changed. If not, control passes to block 150 to return an error. Otherwise, control passes to block 164 to change the second value in the same manner as discussed above. Based upon the result, block 166 either passes control to block 150 to return an error, or to block 168 to return a no error condition, thus signifying that the change was successfully completed.

Figure 7:
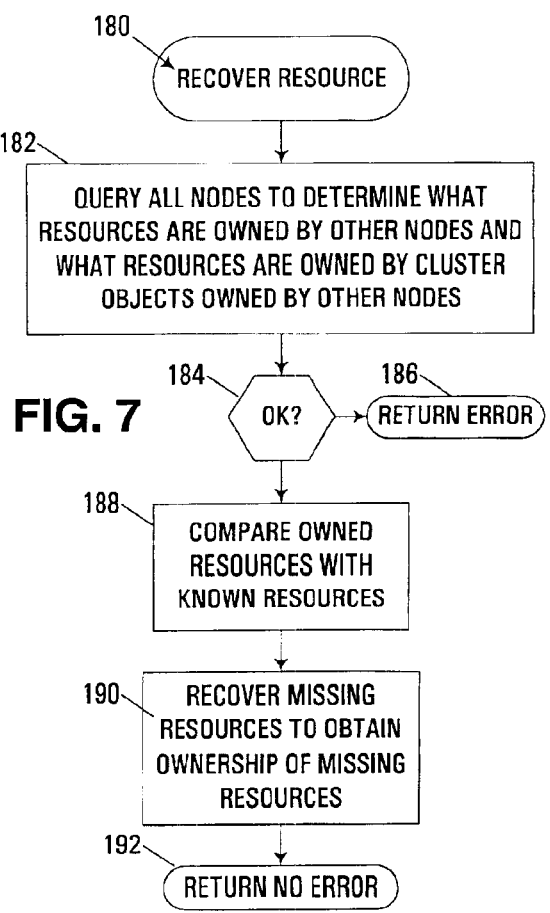
FIG. 7 is a flowchart illustrating the program flow of a recover resource routine implementing an exemplary resource management operation performed by the resource action routine of FIG. 4.

Returning now to FIG. 4, once the prepare for action has been completed, and if a successful result is returned, the desired resource action is performed. As discussed above, a number of different resource actions are contemplated. FIG. 7, for example, illustrates an exemplary recover resource routine 180 that may be performed to recover a particular type of resource, e.g., in response to detecting that a resource of a particular type has been lost.

Routine 180 begins in block 182 by querying all nodes to determine what resources are owned by the other nodes, and what resources are owned by cluster objects that are owned by those other nodes. Block 182 essentially corresponds to taking an inventory of the existing resources in the system. Typically, such inventory consists of the generation of multiple queries to the various nodes, with appropriate responses generated in response the query. Block 182 results in the generation of a list or table of owned resources.

Upon completion of block 182, block 184 determines whether the query was successful, and whether a valid table of owned resources has been generated. If not, control passes to block 186, terminating routine 180 and returning an error condition. Otherwise, control passes to block 188 to compare the owned resources with the known resources that exist in the system. Through this comparison, a list of unowned resources is generated, and as such, block 190 is executed to recover these missing resources to obtain ownership of the missing resources. These unowned resources are also referred to as missing resources, as these resources have become lost by virtue of their lack of ownership by any cluster entity.

Once the missing resources are recovered and claimed by the initiating node, control passes to block 192 to terminate the routine and return a no error condition. The resource recovery is therefore complete.

It should be appreciated that various types of resources may be recovered consistent with the invention. For example, it may be desirable to support the ability to separately recover virtual address ranges, cluster objects, and DASD units.

It may be desirable to support other forms of resource actions. For example, it may be desirable to support a "boundary move" in a virtual address space. In the illustrated embodiment, for example, the virtual address may be partitioned into two ranges allocated respectively to the cluster nodes and the cluster objects. As virtual addresses are allocated to different nodes and objects, the memory space may be consumed from each end of the virtual address space and toward the boundary between the two partitions. If either the cluster nodes or the cluster objects utilize all of the available space within their respective partition, it may be desirable to move the boundary and thus allocate additional memory space to the full partition. Moreover, in the illustrated embodiment, the partition allocated to the nodes permits the reuse of virtual addresses within each node, since the virtual addresses are utilized locally on each node. However, since cluster objects can be owned by various nodes, each virtual address allocated to an object must be unique. Therefore, to perform a move boundary operation, each node must be queried to make sure that movement of the boundary does not conflict with used virtual addresses in the partition that is losing a range of addresses.

Returning again to FIG. 4, upon completion of the performance of various resource actions, end action routine 84 is called to complete the resource action process. Also, as shown in FIG. 5, routine 84 may be called during a prepare operation anytime after the local sandbox is acquired on the local node.

Figure 8:
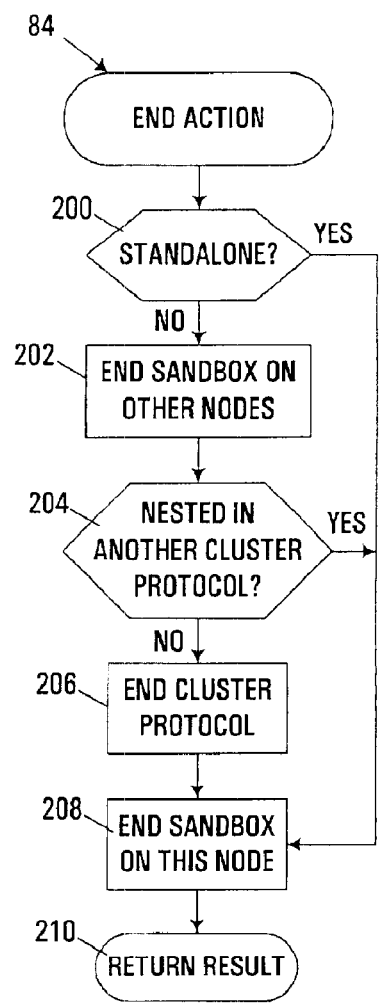
FIG. 8 is a flowchart illustrating the program flow of the end action routine referenced in FIGS. 4 and 5.

End action routine 84 is illustrated in greater detail in FIG. 8. Routine 84 begins in block 200 by determining whether the local node is in standalone mode. If not, control passes to block 202 to end the sandbox on the other nodes, typically by sending a message to each other node to terminate the local sandbox thereon. Next, block 204 determines whether the resource action is nested in another cluster protocol. Assuming first that the resource action is not nested, control passes to block 206 to end the cluster protocol, and then to block 208 to end the local sandbox on the node. The result of the operation is then returned, and routine 84 is terminated in block 210.

Returning to block 200 and 204, if the node is either in standalone mode, or if the resource action is nested in another cluster protocol, the intervening blocks are omitted, and control passes directly to block 208 to end the local sandbox on the node.

Various modifications will be apparent to one of ordinary skill in the art having the benefit of the instant disclosure. Therefore, the invention lies in the claims hereinafter appended.

What is claimed is:

1. A method of performing a resource action on a resource among a plurality of resources in a clustered computer system of the type including a plurality of cluster entities, the plurality of cluster entities including a plurality of nodes and a plurality of cluster objects resident on at least a portion of the plurality of nodes, wherein the plurality of nodes and the plurality of cluster objects are each capable of owning a resource, and wherein each of the plurality of resources is configured to be owned by at most one of the plurality of cluster entities at a time, the method comprising:

(a) acquiring a lock on each active node among the plurality of nodes;

(b) modifying a node configuration parameter for each active node among the plurality of nodes, such that any inactive node among the plurality of nodes is thereafter blocked from being accepted into the clustered computer system;

(c) modifying an object configuration parameter on each active cluster object that could own the resource, such that any inactive cluster object that could own the resource is thereafter blocked from being accepted into the clustered computer system, and such that any inactive node is thereafter blocked from accepting an active cluster object;

(d) performing the resource action on the resource after the lock is acquired and the node and object configuration parameters are modified, wherein performing the resource action changes the ownership of the resource; whereby any inactive node among the plurality nodes that is blocked from being accepted into the clustered computer system after modification of the node configuration parameter is blocked from causing a resource conflict resulting from the change in ownership of the resource; and (e) releasing the lock on each active node after performing the resource action.

2. The method of claim 1, further comprising determining that all cluster objects that could own the resource are active.

3. A method of performing a resource action in a clustered computer system of the type including a plurality of resources and a plurality of cluster entities configured to own the plurality of resources, wherein each of the plurality of resources is configured to be owned by at most one of the plurality of cluster entities at a time, the method comprising:

preparing the clustered computer system prior to performing the resource action by modifying at least one cluster configuration parameter associated with the plurality of cluster entities in the clustered computer system such that any cluster entity that is active during preparation of the clustered computer system accepts the modification to the cluster configuration parameter, and such that any cluster entity that is inactive during preparation of the clustered computer system does not accept the modification to the cluster configuration parameter; and after preparing the clustered computer system, performing a resource action that changes the ownership of at least one of the plurality of resources; whereby any such inactive cluster entity is thereafter blocked from being accepted into the clustered computer system and causing a resource conflict resulting from the change in ownership of the at least one of the plurality of resources.

4. The method of claim 3, wherein the plurality of cluster entities includes a plurality of cluster nodes.

5. The method of claim 4, wherein the cluster configuration parameter includes a cluster identifier stored in each of the plurality of cluster nodes.

6. The method of claim 3, wherein the plurality of cluster entities includes a plurality of cluster objects.

7. The method of claim 6, wherein the cluster configuration parameter includes an object identifier and an ownership transfer count associated with each of the plurality of cluster objects.

8. The method of claim 3, wherein performing the resource action comprises performing a resource recovery operation.

9. The method of claim 8, wherein the resource action comprises recovery of a resource selected from the group consisting of virtual address range, cluster object number, direct access storage device (DASD) number, and combinations thereof.

10. The method of claim 8, wherein the plurality of cluster entities comprises a plurality of nodes and a plurality of cluster objects resident on the plurality of nodes, and wherein performing the resource recovery action comprises:

(a) querying the plurality of nodes in the clustered computer system to determine which of a plurality of resources are owned; and (b) transferring ownership of any unowned resources to a first node among the plurality of nodes.

11. The method of claim 3, wherein preparing the clustered computer system includes obtaining a lock on the clustered computer system prior to modifying the cluster configuration parameter.

12. The method of claim 11, further comprising releasing the lock after performing the resource action.

13. The method of claim 3, wherein the cluster configuration parameter includes a value pair, and wherein modifying the cluster configuration parameter includes sequentially modifying each value in the value pair.

14. The method of claim 3, wherein preparing the clustered computer system includes starting a cluster protocol.

15. The method of claim 3, wherein preparing the clustered computer system includes detecting missing cluster entities capable of owning a resource to be acted upon by the resource action.

16. An apparatus, comprising:

(a) a memory;

(b) a plurality of resources;

(c) a plurality of cluster entities resident in the memory and configured to own the plurality of resources, wherein each of the plurality of resources is configured to be owned by at most one of the plurality of cluster entities at a time; and (d) a program configured to perform a resource action on at least a subset of the plurality of resources in the clustered computer system that changes the ownership of at least one of the plurality of resources, and to prepare the clustered computer system prior to performing the resource action by modifying at least one cluster configuration parameter associated with the plurality of cluster entities in the clustered computer system such that any cluster entity that is active during preparation of the clustered computer system accepts the modification to the cluster configuration parameter, and such that any cluster entity that is inactive during preparation of the clustered computer system does not accept the modification to the cluster configuration parameter; whereby any such inactive cluster entity is thereafter blocked from being accepted into the clustered computer system and causing a resource conflict resulting from the change in ownership of the at least one of the plurality of resources.

17. The apparatus of claim 16, wherein the plurality of cluster entities includes a plurality of cluster nodes and a plurality of cluster objects.

18. The apparatus of claim 17, wherein the cluster configuration parameter includes a cluster identifier stored in each of the plurality of cluster nodes, and an object identifier and an ownership transfer count associated with each of the plurality of cluster objects.

19. The apparatus of claim 17, wherein the program is configured to perform the resource action by querying the plurality of nodes in the clustered computer system to determine which of a plurality of resources are owned, and transferring ownership of any unowned resources to a first node among the plurality of nodes.

20. The apparatus of claim 16, wherein the program is configured to perform the resource action by performing a resource recovery operation on a resource selected from the group consisting of virtual address range, cluster object number, direct access storage device (DASD) number, and combinations thereof.

21. The apparatus of claim 16, wherein the program is further configured to prepare the clustered computer system by obtaining a lock on the clustered computer system prior to modifying the cluster configuration parameter, and releasing the lock after performing the resource action.

22. The apparatus of claim 16, wherein the cluster configuration parameter includes a value pair, and wherein the program is configured to modify the cluster configuration parameter by sequentially modifying each value in the value pair.

23. The apparatus of claim 16, wherein the program is further configured to prepare the clustered computer system by starting a cluster protocol.

24. The apparatus of claim 16, wherein the program is further configured to prepare the clustered computer system by detecting missing cluster entities capable of owning a resource to be acted upon by the resource action.

25. A clustered computer system, comprising:
   (a) a plurality of nodes coupled to one another over a network;
   (b) a plurality of resources;
   (c) a plurality of cluster entities configured to own the plurality of resources, wherein each of the plurality of resources is configured to be owned by at most one of the plurality of cluster entities at a time; and
   (d) a program resident on a first node among the plurality of nodes, the program configured to perform a resource action on at least a subset of the plurality of resources that changes the ownership of at least one of the plurality of resources, and to prepare the clustered computer system prior to performing the resource action by modifying at least one cluster configuration parameter associated with the plurality of cluster entities such that any cluster entity that is active during preparation of the clustered computer system accepts the modification to the cluster configuration parameter, and such that any cluster entity that is inactive during preparation of the clustered computer system does not accept the modification to the cluster configuration parameter; whereby any such inactive cluster entity is thereafter blocked from being accepted into the clustered computer system and causing a resource conflict resulting from the change in ownership of the at least one of the plurality of resources.

26. A program product, comprising:
   (a) a program configured to perform a resource action in a clustered computer system of the type including a plurality of resources and a plurality of cluster entities configured to own the plurality of resources, wherein each of the plurality of resources is configured to be owned by at most one of the plurality of cluster entities at a time, wherein the program is configured to change the ownership of at least one of the plurality of resources when performing the resource action, and wherein the program is further configured to prepare the clustered computer system prior to performing the resource action by modifying at least one cluster configuration parameter associated with the plurality of cluster entities in the clustered computer system such that any cluster entity that is active during preparation of the clustered computer system accepts the modification to the cluster configuration parameter, and such that any cluster entity that is inactive during preparation of the clustered computer system does not accept the modification to the cluster configuration parameter; whereby any such inactive cluster entity is thereafter blocked from being accepted into the clustered computer system and causing a resource conflict resulting from the change in ownership of the at least one of the plurality of resources; and
   (b) a signal bearing medium bearing the program.

27. The program product of claim 26, wherein the signal bearing medium includes at least one of a recordable medium and a transmission medium.

* * * * *

UNITED STATES PATENT AND TRADEMARK OFFICE
CERTIFICATE OF CORRECTION

PATENT NO.    : 6,889,253 B2
DATED         : May 3, 2005
INVENTOR(S)   : Kevin Curtis Griffin, Michael James McDermott and James Gregory Ranweiler It is certified that error appears in the above-identified patent and that said Letters Patent is hereby corrected as shown below:

<u>Title page,</u>
Item [54], Title, "INCORPORATION" should read -- INCORPORATING --.

Signed and Sealed this

Ninth Day of August, 2005

JON W. DUDAS
*Director of the United States Patent and Trademark Office*